United States Patent
Keite-Telgenbüscher et al.

(10) Patent No.: US 11,148,407 B2
(45) Date of Patent: Oct. 19, 2021

(54) METHOD FOR PRODUCING A SEALED FOLDED JOINT

(71) Applicant: tesa SE, Norderstedt (DE)

(72) Inventors: Klaus Keite-Telgenbüscher, Hamburg (DE); Christian Schuh, Hamburg (DE)

(73) Assignee: TESA SE, Norderstedt (DE)

(*) Notice: Subject to any disclaimer, the term of this patent is extended or adjusted under 35 U.S.C. 154(b) by 142 days.

(21) Appl. No.: 16/342,296

(22) PCT Filed: Oct. 16, 2017

(86) PCT No.: PCT/EP2017/076272
§ 371 (c)(1),
(2) Date: Apr. 16, 2019

(87) PCT Pub. No.: WO2018/073140
PCT Pub. Date: Apr. 26, 2018

(65) Prior Publication Data
US 2019/0255832 A1    Aug. 22, 2019

(30) Foreign Application Priority Data

Oct. 17, 2016 (DE) ...................... 10 2016 220 237.5

(51) Int. Cl.
*B32B 37/12* (2006.01)
*C09J 7/22* (2018.01)
(Continued)

(52) U.S. Cl.
CPC ........ *B32B 37/1284* (2013.01); *B21D 39/028* (2013.01); *B29C 53/06* (2013.01);
(Continued)

(58) Field of Classification Search
None
See application file for complete search history.

(56) References Cited

U.S. PATENT DOCUMENTS 4,719,689 A    1/1988 Yamamoto et al.
5,749,992 A    5/1998 Eklund et al.
(Continued)

FOREIGN PATENT DOCUMENTS

DE          32 38 651 A1    4/1984
DE    10 2012 217959 A1    4/2014
(Continued)

OTHER PUBLICATIONS

"Handbook of Pressure Sensitive Adhesive Technology" by Donatas Satas (Satas & Associates, Warwick 1999).
(Continued)

*Primary Examiner* — Barbara J Musser
(74) *Attorney, Agent, or Firm* — Norris McLaughlin, P.A.

(57) ABSTRACT

Methods produce a folded connection, sealed by means of an adhesive composition and by means of first and second sheetlike elements, wherein a flange of the first sheetlike element, having a first surface (11) and a second surface (12), is taken back over a flange of the second sheetlike element. The methods apply at least one layer of an adhesive composition to the flange of the first sheetlike element, bead the flange of the first sheetlike element around the flange of the second sheetlike element, and apply the adhesive composition to both the first and second surfaces of the flange of the first sheetlike element.

12 Claims, 4 Drawing Sheets

(51) Int. Cl.

| | | |
|---|---|---|
| *C09J 7/38* | (2018.01) | |
| *B32B 7/06* | (2019.01) | |
| *B32B 7/12* | (2006.01) | |
| *B32B 15/04* | (2006.01) | |
| *B32B 38/00* | (2006.01) | |
| *C09J 5/06* | (2006.01) | |
| *C09J 7/20* | (2018.01) | |
| *B21D 39/02* | (2006.01) | |
| *B62D 27/02* | (2006.01) | |
| *F16B 11/00* | (2006.01) | |
| *C09J 7/10* | (2018.01) | |
| *B29C 65/48* | (2006.01) | |
| *B29C 65/00* | (2006.01) | |
| *B32B 37/14* | (2006.01) | |
| *B29C 53/06* | (2006.01) | |
| *F16B 5/06* | (2006.01) | |
| *B29L 31/30* | (2006.01) | |
| *B29L 7/00* | (2006.01) | |

(52) U.S. Cl.
CPC ...... *B29C 65/4815* (2013.01); *B29C 65/4825* (2013.01); *B29C 66/1352* (2013.01); *B32B 7/06* (2013.01); *B32B 7/12* (2013.01); *B32B 15/043* (2013.01); *B32B 37/142* (2013.01); *B32B 38/0012* (2013.01); *B62D 27/026* (2013.01); *C09J 5/06* (2013.01); *C09J 7/10* (2018.01); *C09J 7/20* (2018.01); *C09J 7/22* (2018.01); *C09J 7/38* (2018.01); *F16B 11/006* (2013.01); *B29L 2007/002* (2013.01); *B29L 2031/30* (2013.01); *B32B 37/1207* (2013.01); *C09J 2301/21* (2020.08); *C09J 2400/163* (2013.01); *F16B 5/0635* (2013.01)

(56) References Cited

U.S. PATENT DOCUMENTS

| | | | |
|---|---|---|---|
| 5,885,679 A * | 3/1999 | Yasue | A41D 27/24 428/57 |
| 6,000,118 A | 12/1999 | Biernat et al. | |
| 6,063,494 A | 5/2000 | Schümann et al. | |
| 6,294,270 B1 | 9/2001 | Clough | |
| 6,478,915 B1 | 11/2002 | Schmalbrunch et al. | |
| 8,418,418 B2 | 4/2013 | Kohlstrung et al. | |
| 2006/0096511 A1 * | 5/2006 | Zhang | D05B 1/18 112/475.09 |
| 2010/0137530 A1 | 6/2010 | Arai et al. | |
| 2012/0111488 A1 | 5/2012 | Sheasley et al. | |
| 2012/0148856 A1 | 6/2012 | Kohlstrung et al. | |
| 2012/0202013 A1 | 8/2012 | Song | |
| 2014/0193603 A1 | 7/2014 | Elgimiabi | |
| 2015/0158282 A1 | 6/2015 | Morral et al. | |
| 2015/0224757 A1 | 8/2015 | Sassmannshausen et al. | |
| 2015/0321460 A1 | 11/2015 | Sasmannshausen et al. | |

FOREIGN PATENT DOCUMENTS

| | | |
|---|---|---|
| EP | 0 830 530 B2 | 3/1998 |
| EP | 0 842 995 A1 | 5/1998 |
| EP | 0 877 069 A1 | 11/1998 |
| EP | 1 041 130 A2 | 10/2000 |
| EP | 1 334 161 B1 | 8/2003 |
| EP | 1 451 010 B1 | 9/2004 |
| EP | 3 035 396 A1 | 6/2016 |
| JP | S62-131815 A | 6/1987 |
| JP | S62-146716 A | 6/1987 |
| JP | H03-258611 A | 11/1991 |
| JP | H10-128468 A | 5/1998 |
| JP | 2004-337693 A | 12/2004 |
| JP | 2011-505478 A | 2/2011 |
| JP | 2014-523930 A | 9/2014 |
| WO | 1996/021704 A2 | 7/1996 |
| WO | 2004/108401 A2 | 12/2004 |
| WO | 2009/071269 A1 | 6/2009 |
| WO | 2011/020714 A1 | 2/2011 |
| WO | 2011/112643 A2 | 9/2011 |
| WO | 2012/166257 A1 | 12/2012 |
| WO | 2014/037392 A1 | 3/2013 |
| WO | 2013/101693 A1 | 7/2013 |
| WO | 2017/197087 A1 | 11/2017 |

OTHER PUBLICATIONS

English Translation of International Search Report dated Mar. 27, 2018.

German Search Report corresponds to German Application No. 10 2016 220 237.5, dated Jun. 22, 2016.

* cited by examiner

METHOD FOR PRODUCING A SEALED FOLDED JOINT

This application is the U.S. National Stage of International Application No. PCT/EP2017/076272, filed Oct. 16, 2017, which claims foreign priority benefit under 35 U.S.C. § 119 of German Application No. 10 2016 220 237.5 filed Oct. 17, 2016.

The present invention relates to a method for producing a folded connection, sealed by means of an adhesion composition, between a first sheetlike element, which comes to lie externally in the fold, and a second sheetlike element, which comes to lie internally in the fold, where a flange of the first sheetlike element is taken back over a flange of the second sheetlike element and where the flange of the first sheetlike element has a first surface and a second surface, comprising the steps of:
(A) applying at least one layer of an adhesive composition to the flange of the first sheetlike element;
(B) bending the flange of the first sheetlike element around the flange of the second sheetlike element,
and also to a folded connection obtainable by this method, to the use of an adhesive tape for producing a folded connection sealed by means of an adhesive composition, and to a double-sided adhesive tape for producing a sealed folded connection.

A folded connection between two panels is produced by taking an extended edge section of one panel back over an edge section of the other panel. The outcome of the folding is referred to as a folded or bent seam or bent edge, and the connection as a folded or bent edge connection. In vehicle bodies, folded connections can be found at various points where two panels are joined to one another, for example on doors, boot lids and bonnets. A vehicle door, for example, may be produced from an inside panel and an outside panel, joined along their outer edges via a folded connection, which is produced by wrapping the extended edge section of the outer panel over the edge section of the inner panel in order to produce an overlapping join, and squeezing the edges with one another. A seal is then needed between the edge of the outer panel and the adjacent surface of the inside panel, in order to keep moisture out of the space between the panels and to prevent corrosion.

If the folded or bent edge connection is sealed, the term used is that of a bent fold seal or—where adhesive is used—of a bent edge bond.

The bonding or sealing of sheet-metal parts in vehicle construction, especially in the case of bodies of motor vehicles, is frequently performed on untreated sheet-metal parts. The adhesive/sealants used in this process are cured later on in the paint drying ovens. Beforehand, the bonded/sealed parts pass through cleaning, phosphating and dip-priming stages. The adhesive/sealant can be flushed out of the joins by the treatment agents used in these stages. To meet these requirements, a variety of procedures have become known, with examples including the thermal/inductive pre-curing of low-viscosity adhesives/sealants in paste form, the use of adhesives in the form of solvent-containing compositions or hotmelts, as two-component products or else as shaped parts, which in general are applied manually and at the time of application possess an inherent tack.

PRIOR ART

In the context of bent fold sealing in motor vehicle construction, it is usual, over the outwardly open region of the fold, to place a curable material, especially in the form of a bend, which in a first curing operation, of—for example—inductive heating of the sheet in the region of the curable composition, is gelled and in a downstream curing operation, particularly in the CEC oven, is completely cured. PVC in particular is used here as curable composition. This process gives rise to problems when the curable material masks air inclusions or before the ultimate curing has absorbed liquids or gases which, on the subsequent oven curing, expand and form outwardly visible bubbles. These bubbles on the one hand disturb the visual appearance (visual defects) and on the other hand form weak points in the sealing with respect to corrosive attack.

In an alternative manufacture in the context of production of parts for installation on vehicles, such as of doors, tailgates and front flaps, sliding roof tops, etc., two sheet-metal parts are joined by folding. In the bodyshell, first an adhesive is applied to the oiled metal sheet, usually consisting of steel, hot-dip-galvanized or electrolytically galvanized steel, magnesium or aluminium, along the edge of the outer part, by means of extruding, injecting or spraying methods, for example, in a layer thickness of 0.2 mm, for example, and, following insertion of the inner part, the outer edge of the outer part is bent around the periphery of the inner part. The edge of the outer part that is at risk from corrosion is only sealed thereafter, in the finishing operation, usually by hand, with a sealant, such as PVC plastisols, for example.

WO 2011/020714 A1 (Henkel) discloses an adhesive composition based on rubbers that can be used at the same time as a bent seam seal. This is a composition in paste form that can be applied by injection, extrusion or spraying techniques. This is also the drawback of this composition, since application errors and oozing can easily develop, and impair the visual appearance of the bent seam.

Moreover, liquid preparations or those in paste form are generally more sensitive to being washed out in the cleaning and coating baths that are used, compared with adhesive tapes of higher viscosity.

In EP 1 041 130 A2 (VW-Sika), this drawback is moderated by a method wherein the sealant/adhesive is cured in a number of stages. Drawbacks are the high levels of cost and complexity involved in the chemical implementation of a plurality of curing mechanisms within the composition, and also in the implementation of a plurality of different curing processes.

EP 1 334 161 B1 (L+L Products Inc.) discloses a method for making and reinforcing a joint, comprising the steps of:
a) providing two substrates between which there is a spacing to be provided with a join;
b) directly supplying a separate hotmelt thermoset material in the proximity of the spacing;
c) heating the material to cause the material to flow into, fill the defined region or spacing and to cure so as to join the substrates, the material being supplied preferably in the form of a rod. A drawback here is the high cost and complexity of the melting of the material prior to flow into the bondline. There is also a risk that the bondline will not be fully filled and that air inclusions will remain.

U.S. Pat. No. 4,719,689 A (Nissan) discloses a method for the simultaneous bonding and sealing of a bent seam, wherein the bent tool is provided with a recess which shapes the adhesive emerging from the bent seam to form a visually appealing seal layer. A drawback is that, in the case of an imprecisely metered or placed volume of adhesive, the recess is underfilled or overfilled, to the possible detriment of the sealing function and the appearance.

A further solution for avoiding the drawbacks of liquid and/or paste-like adhesives/sealants lies in the use of adhesive tapes for the bonding or sealing of bent folds.

U.S. Pat. No. 6,000,118 A (Chrysler) discloses a preshaped strip of adhesive composition which is squeezed during bending. As in the case of beads of adhesive, this harbours the risk of oozing.

EP 0 830 530 B2 (3M) discloses a sealing strip which is suitable for sealing a join between two surfaces which lie adjacently, generally in parallel planes, examples being surfaces (such as panels) which abut or overlap one another. The invention is applicable in particular, but not exclusively, to a sealing strip which is suitable for the sealing of a folded connection of the kind which may be found in a vehicle body. The sealing strip here has an inner surface for affixing the strip over the connection, and a rounded, shape-retaining outer surface; the profile of the strip is such that the outer surface of the strip, when the strip is affixed in its position over the join, extends from one of the adjoining surfaces to the other. Drawbacks with this solution are the inconvenient pre-shaping of the outer surface of the strip, and also the multi-layer construction required.

EP 1 451 010 B1 (3M) and WO 2004/108401 A2 disclose in similar ways a flange profile sealing material which has at least two layers, for the sealing of a flange profile of metal sheets in a vehicle, where the flange profile sealing material is characterized in that it comprises an inner layer, which comprises a hotmelt/fluid thermosetting resin with a cure temperature of 80 to 200° C., and an outer layer, which shows no substantial fluidity/shape change at 80 to 200° C.; the hotmelt/fluid thermosetting resin can be liquefied and then cured in order to form a seal. The sealing material is shaped externally and completely around the flange which has already been produced. It therefore performs only a sealing function and not any substantial mechanical joining function (adhesive bonding).

WO 2012/166257 A1 (3M) discloses a method for producing a folded connection by first applying an adhesive tape to the inner or outer metal sheet of the folded connection, then wrapping the outer sheet around the inner sheet, so that the adhesive tape comes to lie completely between the outer and inner sheets of the folded connection, and then curing the adhesive tape. With this method, a bent seam bond is produced. A disadvantage is that in the case of the adhesive bond, the edge of the outer folded sheet remains unprotected and has to be sealed in a further operation.

WO 2009/071269 A1 (Zephyros) discloses the application of two adhesive tapes (FIG. 2) to one of the metal flange sheets. During subsequent bending, the adhesive tape is squeezed out of the bent joint and forms a seal to both the inner and outer sides of the fold. In spite of the use of an adhesive tape, there is a considerable flow process here, as in the case of the liquid adhesive, and this process harbours the drawbacks identified above.

It was an object of the present invention, therefore, to provide a method for simultaneous bonding and sealing of a folded connection, that can be carried out with low cost and complexity and produces a sealed seam which visually is an improvement on the prior art.

The object is achieved by means of a method of the type specified at the outset, wherein the adhesive composition is applied to both surfaces of the flange of the first sheetlike element, and after the production of the folded connection, the adhesive composition on the first surface, with the adhesive composition on the second surface of the flange of the first sheetlike element, at the edge of the flange, forms a continuous layer which covers the edge of the flange of the first sheetlike element.

In the method of the invention, the flange of the sheet structure that comes to lie externally is provided on both surfaces, before the production of the folded connection, with one layer each of a sealant and/or adhesive composition, with the projection of the layer on the first side into the plane of the layer on the second side lying at least partly within the layer on the second side and, after the production of the folded connection, the layer of adhesive composition on the first surface of the flange is joined with that on the second surface. Projection in this context means a projection at right angles to the plane of the layer.

A flange is the term for that part of a sheetlike structure, generally located at the edge, which becomes a constituent of the folded connection, as an interior or exterior part. The flange has a first surface and a second surface. The flange which comes to lie on the outside in the folded connection is referred to hereinafter as outer flange, while that which comes to lie on the inside is referred to as the inner flange.

For the formation of the flanged connection there are various possibilities. First, the second flange may lie with its end section in a region on the first side of the first flange on which adhesive composition has been applied, so that there is a region in which the adhesive composition is arranged between the two flanges (cf. FIG. 1.2). In another variant, the second flange is spaced apart from the region of the flange provided with adhesive composition, directly on the first side of the first flange (cf. FIG. 2.2). In this case, although the distance from the second flange to the adhesive composition is small, there is initially a cavity not filled with adhesive composition that is produced on bending.

The layers of adhesive composition applied to either side of the outer flange may be alike or different. Before the folded connection is produced, the layers of adhesive composition may each be present individually or may already be coherent in form. In the case of individual layers of adhesive composition, they may consist of the same adhesive composition or of different adhesive compositions. In the case of a layer of adhesive composition that is already coherent, as well, it is possible for two different adhesive compositions to already be coherent, i.e. to be joined to one another. Where the layers of adhesive composition are present individually they are joined into a continuous layer during production of the folded connection. A coherent layer of adhesive composition is preferred. It is therefore particularly preferred if the application of the layer of the adhesive composition in step A takes place in the form of a continuous layer which covers the first surface, the second surface and the edge of the flange.

The adhesive composition is preferably an activatable adhesive composition, and in a further step (C) is activated after the bending has taken place in step (B) to produce the folded connection. The activating procedure causes the adhesive composition to cure. During the activating process, the adhesive composition preferably first becomes fluid. It flows onto the flanges, so producing a high-quality bonding and sealing. As a result of the flow, a coherent layer of adhesive composition is now obtained, ensuring complete sealing of the folded connection, even in the event that the layers of adhesive composition were not joined prior to the production of the folded connection. In a further preferred embodiment, therefore, a layer of adhesive composition is applied to the first surface and a further layer of adhesive composition is applied to the second surface of the outer flange, with the two layers being joined into a continuous layer through activation of the adhesive composition during production of the folded connection.

The layer of adhesive composition may be applied from a fluid phase, in the form for example of a solution, dispersion, melt, or as a 100% system. The layer of adhesive composition may also be applied from a solid phase, in the form of a powder coating, for example. The layer of adhesive composition is applied preferably as adhesive tape.

The layers of adhesive composition applied to the first and second sides of the outer flange may be alike or different. In particular they may be alike or different adhesive tapes.

The joining of the adhesive compositions on the first and second sides of the outer flange may be present or produced during application itself, or is produced during or after bending. For example, the adhesive compositions may be pressed into one another during the bending operation. The adhesive compositions may also flow into one another during an activating step, in particular as a result of thermal activation.

Preferably the connection is produced during application itself or at this point in time is already present by virtue of the embodiment of the adhesive composition provided, in the form of an adhesive tape, for example.

A double-sided adhesive tape is preferably applied to the first surface of the outer flange, the surface facing the inner flange. On the other second surface, a single-sided adhesive tape is preferably applied. A single-sided adhesive tape preferably comprises a carrier material which in the bond to the second surface is disposed on the side of the layer of adhesive composition that is opposite the surface. The adhesive tape in this case may be provided partially or completely with a carrier material.

The carrier material comprises all sheetlike structures, examples being two-dimensionally extended sheets or sheet sections, tapes with extended length and unlimited width, tape sections, diecuts, multilayer arrangements and the like. For different applications, a very wide variety of different carriers—such as, for example, sheets, woven fabrics, nonwoven webs and papers—can be combined with different adhesives.

Carrier material used for an adhesive tape preferably comprises polymer sheets, sheet assemblies or else sheets or sheet assemblies provided with organic and/or inorganic layers. Sheets/sheet assemblies of these kinds may consist of all common plastics used for producing sheets, as for example—though without limitation—the following: polyethylene, polypropylene—particularly the oriented polypropylene (OPP) produced by mono- or biaxial drawing, cyclic olefin copolymers (COCs), polyvinyl chloride (PVC), polyesters—especially polyethylene terephthalate (PET) and poylethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

The carrier material preferably has a softening temperature which is below the activation temperature of the adhesive composition. In this case, when the adhesive composition is activated, the carrier material softens and is able to flow and so to compensate stresses due to shrinkage or expansion.

In one preferred version, a single adhesive tape is applied around the edge of the flange.

If this adhesive tape is a double-sided adhesive tape, then it is generally lined with a liner at least on one side.

Pressure-sensitive adhesive tapes coated on one or both sides with adhesives are usually wound up to form a roll in the form of an archimedean spiral or in cross-wound form at the end of the production process. To prevent the adhesive compositions making contact with one another in the case of double-sided adhesive tapes, or in order to prevent the adhesive composition sticking to the carrier in the case of single-sided adhesive tapes, the adhesive tapes prior to winding are lined with a liner material (also referred to as release material) which is wound up together with the adhesive tape. The skilled person also knows such liner materials under the name of liners or release liners. In addition to the lining of single-sided or double-sided adhesive tapes, liners are also used for enclosing pure adhesive compositions (adhesive transfer tape) and adhesive tape sections (labels, for example). These liners additionally ensure that the adhesive composition is not fouled prior to the application.

A liner is not a constituent of an adhesive tape, but rather only a tool to its production, storage or further processing. Similarly, the assembly is only temporary and not permanent.

A prior-art liner consists of at least one adhesive layer (release layer) in order to lower the tendency of adhering products to adhere with respect to these surfaces (active release function). This layer may be applied on a carrier material.

Release layers which can be used are all of the systems known to the skilled person, especially those referred to in the "Handbook of Pressure Sensitive Adhesive Technology" by Donatas Satas (Satas & Associates, Warwick 1999). According to the prior art, the material of the adhesive release layer is preferably selected from the group encompassing silicones, fluorinated silicones, silicone copolymers, waxes, carbamates, fluoropolymers and polyolefins, or mixtures of two or more of the compounds stated.

As liner carrier material it is possible in particular to use papers or sheets. Sheets used in this case are preferably those made of biaxially oriented polyethylene terephthalate, polybutene, polypropylene, polyethylene, monoaxially oriented polypropylene, biaxially oriented polypropylene or polyethylene, with particular preference polyolefin films (polypropylene and polyethylene films) or polyester films. Polymer-coated papers or nonwovens are also encountered.

This liner is removed at least from the adhesive tape or part of the adhesive tape that is located on the first surface of the outer flange, this removal being performed before the bending. Preferably the liner is removed only on the adhesive tape or part of the adhesive tape that is located on the first surface of the outer flange, so that during bending there is no adhesion to the bending tool. In the embodiment of a single adhesive tape with bonding around, this is facilitated by a liner which is perforated or in two parts in the longitudinal direction of the adhesive tape, with in that case only one part being removed before the bending.

Disclosed accordingly is the use of an adhesive tape with a multi-part or perforated liner during the production of a folded bond and seal.

In one preferred version, the adhesive tape is an adhesive tape consisting of two strips disposed parallel to one another and comprising different adhesive compositions. These strips are arranged next to one another on a single liner with a density such that they are connected to one another or that a connection comes about in the course of the method. The second adhesive composition, located on the second surface of the outer flange, preferably has a lower modulus of elasticity, after an optional activation step, than the first adhesive composition, which is located on the first surface. This prevents the incidence of cracks in the surface of the second adhesive composition as a result, for example, of thermal processes of expansion and/or shrinkage during further steps in the method to which the flanged connection is subject, and so leads to a visually better appearance.

In a further-preferred version, the adhesive tape bonded around the edge of the flange is a partially single-sided adhesive tape. In this arrangement the carrier material is applied in longitudinal direction only to the part of the width of the adhesive tape that comes to lie on the second side of the outer flange. Consequently, the part of the adhesive tape that comes to lie on the visible side of the folded connection is lined with a carrier material and is therefore more visually appealing and also better protected from ambient effects. Here, the carrier material may also be guided around the edge of the flange, or the edge may be free from carrier material. The former is preferred, since in that case the edge is better protected mechanically.

Also disclosed, therefore, is an adhesive tape and also its use in the production of a folded connection, said tape being provided in longitudinal direction only for part of its width with a carrier material or a liner material. Disclosed, therefore, is a partially double-sided adhesive tape for producing a sealed folded connection, consisting of a carrier material and a liner material, a first strip of a first adhesive composition, a second strip of a second adhesive composition, where the second adhesive composition may be different from the first, the two adhesive-composition strips are arranged next to one another in longitudinal direction, and the liner covers at least one of the two adhesive-composition strips, where the carrier material hides only the second adhesive-composition strip and the liner hides at least the first adhesive-composition strip.

The adhesive composition is preferably an activatable pressure-sensitive adhesive composition, more particularly a thermally activatable pressure-sensitive adhesive composition. The carrier or liner material is preferably a thermoplastic polymer whose softening temperature lies below the activation temperature of the adhesive composition. This has the advantage that on activation of the adhesive composition, the material flows and is therefore able to compensate stresses due to shrinkage or expansion.

It is preferred, furthermore, for the adhesive composition of the second adhesive-composition strip, which is hidden by the carrier material, to have a lower modulus of elasticity after activation than the adhesive composition of the first adhesive-composition strip.

The adhesive composition used may comprise pressure-sensitive adhesive compositions, hotmelt adhesive compositions or activatable adhesive compositions.

Especially preferred is an activatable pressure-sensitive adhesive composition. This has the advantage that an adhesive assembly of the sheetlike structure is produced even before activation. The activation then increases the strength of the adhesive join.

Suitable activatable pressure-sensitive adhesives include all known activatable pressure-sensitive adhesives. Compositions and production of such activatable pressure-sensitive adhesive compositions are known and familiar to the skilled person.

Particularly suitable activatable pressure-sensitive adhesive compositions are those prepared from compounds having at least one of the following functional groups: epoxides, amines, ureido groups, hydroxyl groups, ether groups, acid groups, especially carboxylic acid groups, preferably acrylic and methacrylic acid groups, and carboxylic anhydride groups, ester groups and amide groups, isocyanates, imidazoles, phenolic groups, urea groups, silane groups, ethylenic double bonds, especially in conjunction with initiator groups which are able to initiate a radical polymerization, or with sulfur-containing vulcanizing agents.

The activatable pressure-sensitive adhesive compositions may selectively comprise one or more further formulating ingredients such as, for example, curing agents, reaction accelerators, catalysts, initiators, fillers, microspheres, tackifier resins, non-reactive resins, plasticizers, binders, bitumen, ageing inhibitors (antioxidants), light stabilizers, UV absorbers, rheological additives, and also auxiliaries and adjuvants.

Examples of suitable adhesive compositions for the present invention are found in EP 1 334 161 B1, in EP 0 877 069 B1, in EP 0 842 995 B1, in U.S. Pat. No. 6,294,270 B1, in US 2010/0137530 A1, in US 2012/0111488 A1, in WO 1996/021704 A2, in WO 2011/112643 A2 or in WO 2013/101693 A1, this enumeration being purely exemplary and in no way exhaustive.

In one particularly preferred embodiment, the activatable adhesive composition is expandable. Expandable in this context means that the volume of the adhesive composition after expansion is above that of the adhesive composition before the expansion, measured in each case at the same temperature (generally room temperature, 15 to 30° C.). The increase in volume is preferably more than 5%. Expansion may be accomplished chemically or physically. The adhesive composition preferably comprises a thermally activatable foaming agent.

In this case the activatable, foaming agent-filled adhesive composition after foaming preferably has a density of 900 kg/m$^3$, more particularly of 700 kg/m$^3$.

According to one advantageous embodiment, the foaming agent comprises microspheres which consist of a polymer membrane enclosing a blowing agent—microballoons, as they are known. The proportion of these microballoons in the adhesive composition is more preferably between 0.5 and 20 wt %, with further preference between 2 and 12 wt %. Microballoons are hollow elastic spheres which have a thermoplastic polymer shell. These spheres are filled with low-boiling liquids or liquefied gas. Shell materials used include, in particular, polyacrylonitrile, PVDC, PVC or polyacrylates. Suitable low-boiling liquid comprises, in particular, hydrocarbons of the lower alkanes, as for example isobutane or isopentane, which are enclosed in the form of liquefied gas under pressure in the polymer shell. Action on the microballoons, particularly through exposure to heat, results first in softening of the outer polymer shell. At the same time, the liquid blowing gas present within the shell is converted into its gaseous state. The microballoons expand irreversibly and three-dimensionally. Expansion is at an end when the internal pressure is equal to the external pressure. Since the polymeric shell is retained, the result is a closed-cell foam.

The expansion of the adhesive composition takes place preferably parallel to the activation in step (C). In another preferred embodiment, the expansion takes place following the activation in a further step (D).

Another effect of using an expandable adhesive composition is that the cavity not filled with adhesive composition, in the case of one variant of flange formation, becomes filled with adhesive composition.

The method is illustrated by way of example in the figures hereinafter. In these figures.

Figure 1:
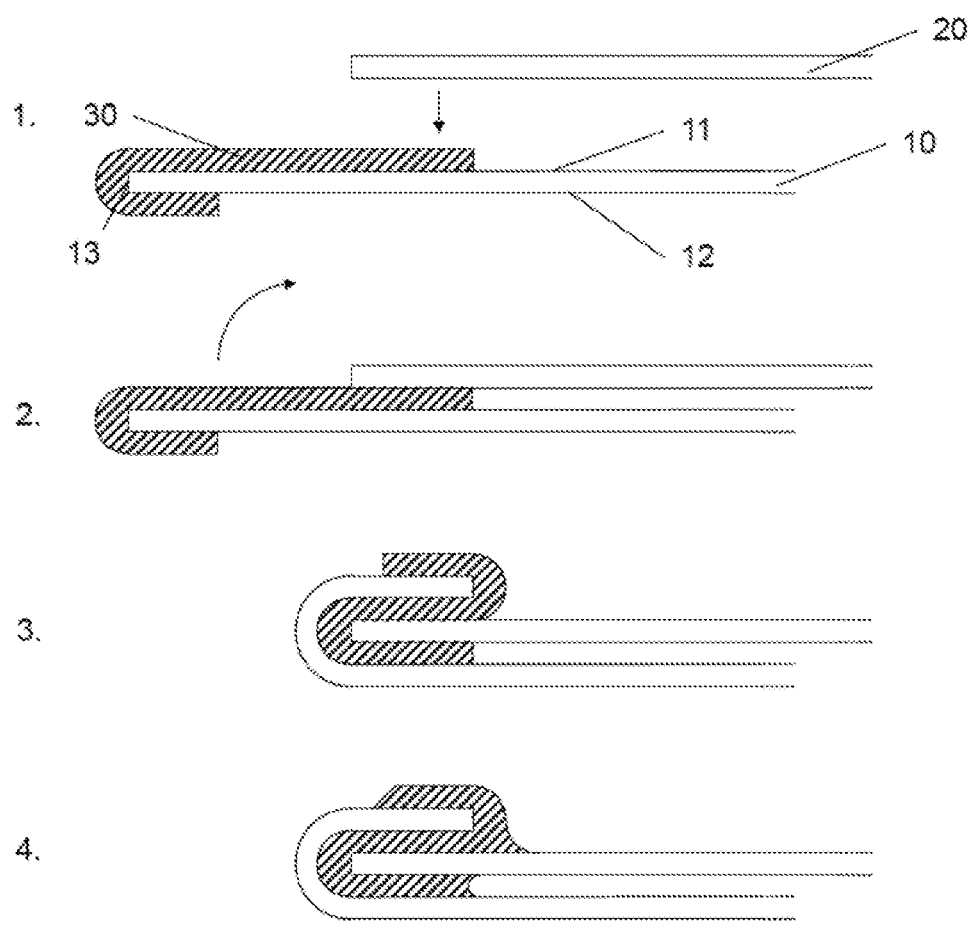
FIG. 1 shows a diagrammatic representation of the steps in producing a folded connection in a first variant of the invention, the flange shown in cross section.

FIG. 1 shows an outer flange 10 of a first sheetlike structure having a first surface 11 and a second surface 12, with an adhesive tape 30 applied around the edge on both surfaces. The edge 13 is therefore likewise covered by the adhesive tape 30. In the first step, the adhesive tape, already applied, can be seen on the first, outer flange. The inner flange 20 of the second sheetlike structure is shown still at a distance from the first flange.

To produce the folded connection, in step 2 the inner flange 20 of the second sheetlike structure is brought into contact with the adhesive tape 30 on the first surface 11 of the outer flange 10, and then, in step 3, the outer flange 10 is bent around the inner flange 20. As a result of the application of the adhesive composition in the form of adhesive tape 30, there is no oozing of the adhesive composition, as would be the case with liquid adhesives.

Then, in a thermal activation step 4, the adhesive tape 30 is cured. During the activation process, the adhesive tape 30 first becomes fluid, so that the adhesive tape 30 flows onto the flanges 10 and 20 and therefore a high-quality bond and seal is produced.

Figure 2:
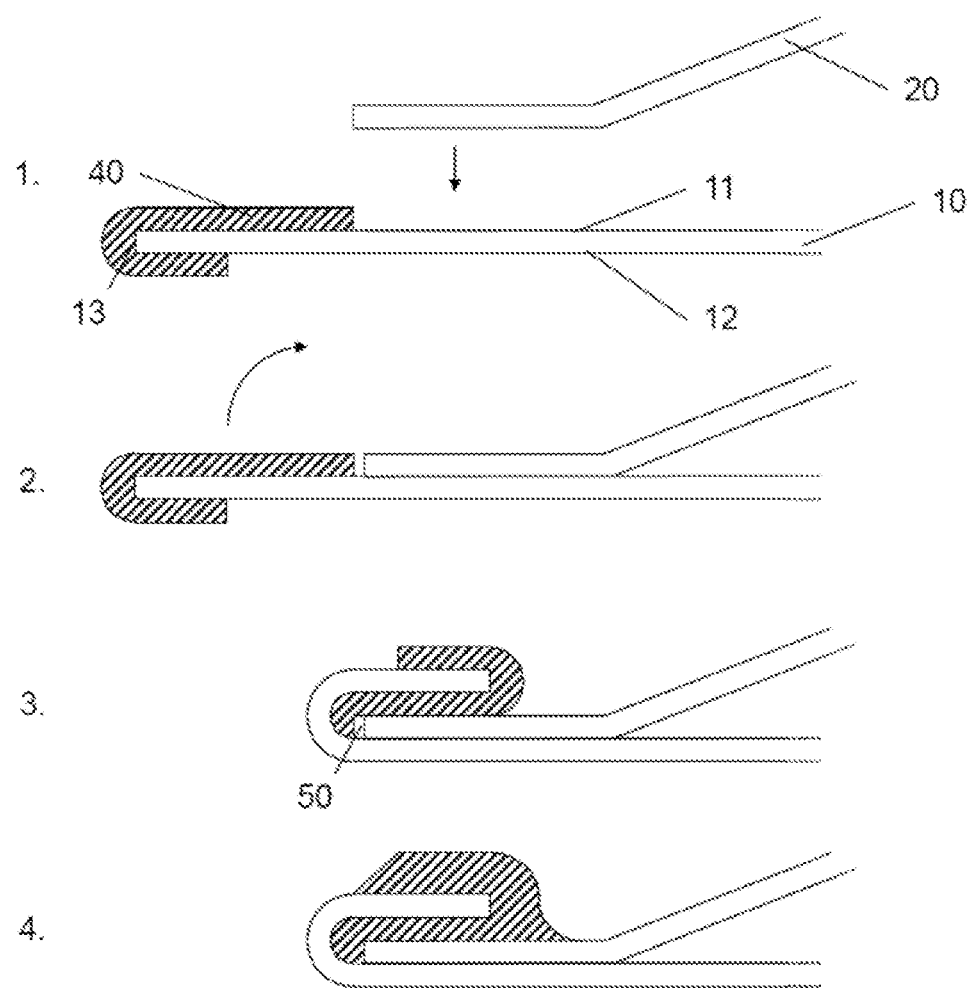
FIG. 2 shows a schematic representation of the steps in producing a folded connection in a second variant of the invention.

In a second variant of the present invention, FIG. 2 likewise shows an outer flange 10 of a first sheetlike structure having a first surface 11 and a second surface 12. In this variant there is an expandable adhesive tape 40 applied around the edge on both surfaces. The edge 13 is therefore again covered by the adhesive tape 40. Here, furthermore, the inner flange is shown as an angled flange. The flange might equally well be planar in design. Conversely, for the variants shown in FIGS. 1 and 3, the flanges might also be angled in design rather than planar.

To produce the folded connection in the case of this variant, in step 2, the inner flange 20 of the second sheetlike structure is brought into contact with the first surface 11, but at a distance from the adhesive tape 40. Then, in step 3, the outer flange 10 is bent around the inner flange 20. As a result of the application of the adhesive composition in the form of adhesive tape 40, there is no oozing of the adhesive composition here either, as would be the case with liquid adhesives; however, a cavity 50 is formed which is not filled with adhesive composition.

The adhesive 40 is then cured in a thermal activation step 4, and expands. During the activation process, the adhesive tape 40 first becomes fluid, so that the adhesive tape 30 flows onto the flanges 10 and 20 and therefore a high-quality bond and seal is produced. The expansion causes the cavity 50 to close and increases the layer thickness of the adhesive tape 40 on the outer flange side 12, so leading to improved mechanical protection.

Figure 3:
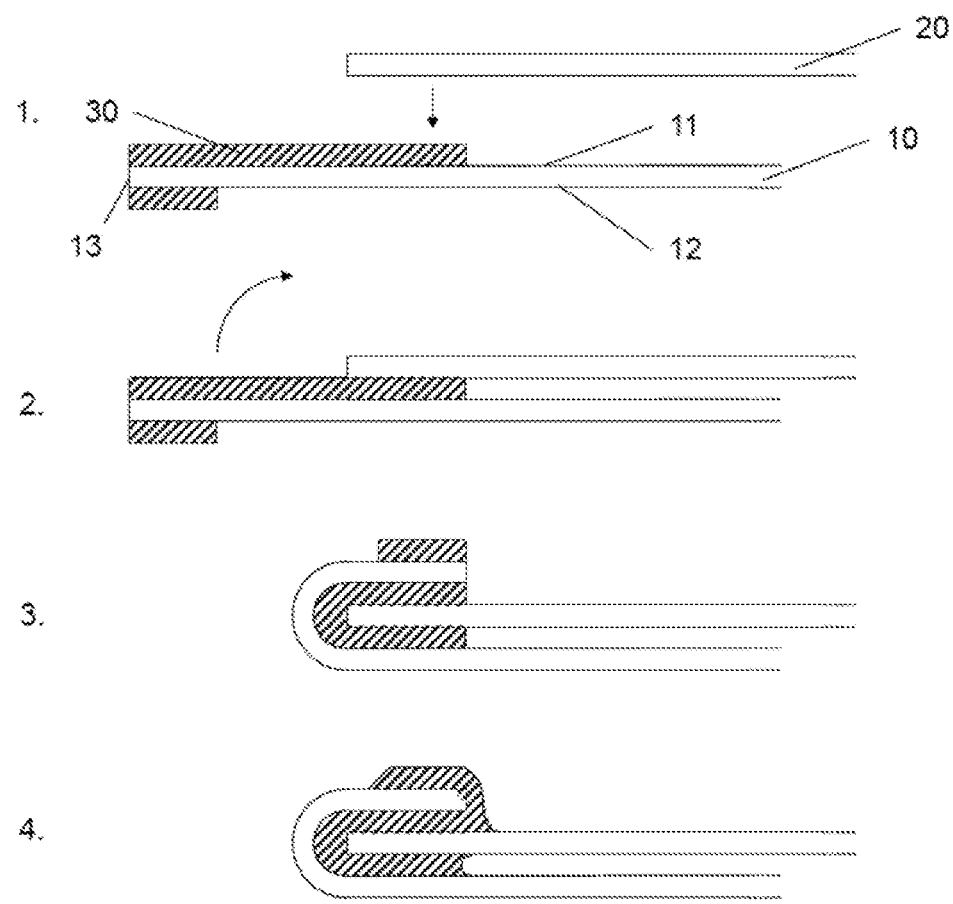
FIG. 3 shows a schematic representation of the steps in producing a folded connection in a third variant of the invention.

In the variant of the present invention that is shown in FIG. 3, an outer flange 10 of a first sheetlike structure is provided with one adhesive tape 30 on each of its first surface 11 and its second surface 12. The adhesive tape may consist of the same adhesive composition; the adhesive compositions, however, may also be different. In this variant, the adhesive tape is not guided around the edge, and so the edge 13 is not covered by the adhesive tape 30, but is instead exposed in step 1 prior to the bending.

To produce the folded connection, in step 2, the inner flange 20 of the second sheetlike structure is brought into contact with the adhesive tape 30 on the first surface 11 of the outer flange 10, and then, in step 3, the outer flange 10 is bent around the inner flange 20. As a result of the application of the adhesive composition in the form of adhesive tape 30, there is no oozing of the adhesive composition, as would be the case with liquid adhesives. The edge 13 is also still free in steps 2 and 3.

The adhesive tape 30 is then cured in a thermal activation step 4. During the activation process, the adhesive tape 30 first becomes fluid, so that the adhesive tape 30 flows onto the flanges 10 and 20 and also onto the edge 13, and so produces a high-quality bond and seal.

Figure 4:
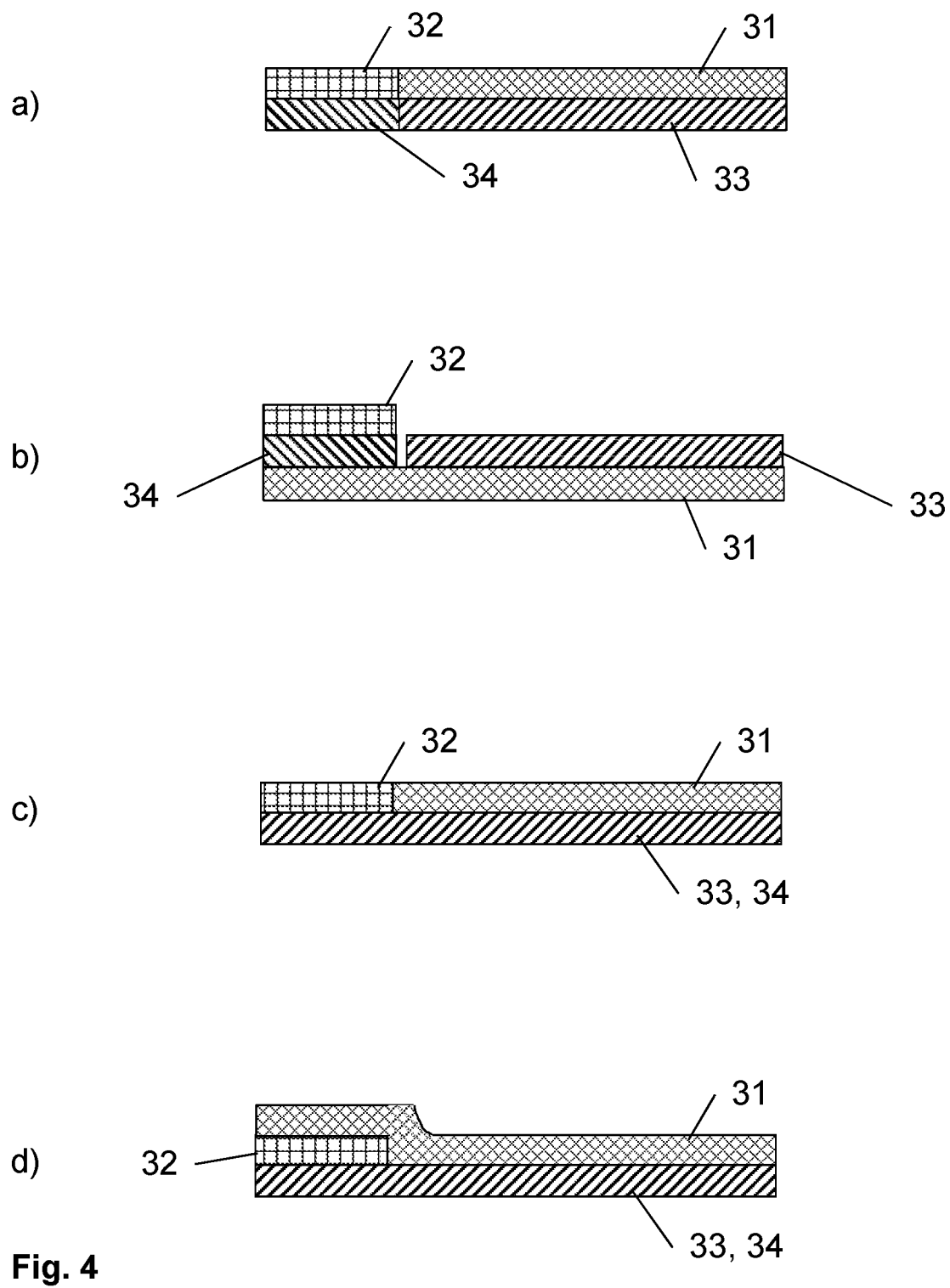
FIG. 4 shows various embodiments of an adhesive tapes of the invention for folded bonding, in cross section.

FIG. 4 shows various embodiments of a partially double-sided adhesive tape (30) of the invention for folded bonding.

In embodiment (a), a liner (31) hides a first adhesive-composition strip (33) composed of a first adhesive composition, and a carrier material (32) hides a second adhesive-composition strip (34) composed of a second adhesive composition. The adhesive compositions of the adhesive-composition strips (33, 34) are different. The adhesive-composition strips may be present as shown in contact with one another or else at a distance from one another. If they are at a distance from one another, it is advantageous for the liner (31) to hide both adhesive-composition strips, in order to make the assembly stabler. This is shown in embodiment (b).

The carrier material is arranged in longitudinal direction only on a part of the width of the adhesive tape. In the case of different adhesive compositions, only one adhesive composition may perform at least partial covering, or else a plurality of adhesive compositions. The carrier material is advantageously arranged on the edge of the adhesive tape, as shown in FIG. 4.

In the advantageous embodiment (c), the adhesive compositions of the adhesive-composition strips (33, 34) are identical and the strips are in contact with one another. The carrier material is optionally furnished with a release agent, and the liner is of double-sidedly releasing configuration, allowing the adhesive tape to be wound into a roll, advantageously, without the use of a further liner.

In the preferred embodiment (d), the liner hides not only the first adhesive-composition strip but also the carrier material likewise. As a result, the carrier material is protected and the liner can be removed more easily by virtue of the lack of adhesion to the carrier material. If the liner in this embodiment is of double-sidedly releasing configuration, the adhesive tape can be wound to a roll without a further liner.

The invention claimed is:

1. A method for producing a folded connection, sealed by means of an adhesion composition, between an outer panel, that comes to lie externally in a fold, and an inner panel, that comes to lie internally in the fold, wherein a flange of the outer panel is taken back over a flange of the inner panel, and the flange of the outer panel has a first surface and a second surface, the method comprising:

(A) applying at least one layer of an adhesive composition to the flange of the outer panel; and (B) bending the flange of the outer panel around the flange of the inner panel, wherein the adhesive composition is applied to both the first and second surfaces of the flange of the outer panel, wherein, after the production of the folded connection, the adhesive composition on the first surface, with the adhesive composition on the second surface of the flange of the outer panel, at an edge of the flange, forms a continuous layer covering the edge of the flange of the outer panel, and further wherein the outer panel and the inner panel are vehicle body panels.

2. The method according to claim 1, wherein the adhesive composition is an activatable adhesive composition and the adhesive composition for producing the folded connection is activated in a further (C).

3. The method according to claim 1, wherein, in (A), the layer of the adhesive composition is applied as a continuous layer which covers the first surface, the second surface, and the edge of the flange.

4. The method according to claim 2, wherein, in (A), a layer of the adhesive composition is applied to the first surface and a further layer of the adhesive composition is applied to the second surface of the flange, and, during production of the folded connection in (B) or by activation of the adhesive composition in (C), the two layers are joined into a continuous layer.

5. The method according to claim 1, wherein the adhesive composition is applied as an adhesive tape.

6. The method according to claim 5, wherein the adhesive tape is provided at least partially with a carrier material.

7. The method according to claim 6, wherein the carrier material has a softening temperature that lies below the activation temperature of the adhesive composition.

8. The method according to claim 1, wherein the adhesive composition is a pressure-sensitive adhesive composition, a hotmelt adhesive composition, an activatable adhesive composition, or an activatable pressure-sensitive adhesive composition.

9. The method according to claim 2, wherein the adhesive composition is an expandable adhesive composition.

10. The method according to claim 9, wherein the expansion of the adhesive composition takes place parallel to the activation in (C) or in a further (D).

11. A method for producing a folded connection, sealed by means of an adhesion composition, between an outer panel, that comes to lie externally in a fold, and an inner panel, that comes to lie internally in the fold, wherein a flange of the outer panel is taken back over a flange of the inner panel, and the flange of the outer panel has a first surface and a second surface, the method comprising:
  (A) applying at least one layer of an adhesive composition to the flange of the outer panel, wherein the adhesive composition is an activatable adhesive composition for producing the folded connection;
  (B) bending the flange of the outer panel around the flange of the inner panel; and
  (C) activating the adhesive composition,
  wherein the adhesive composition is applied to both the first and second surfaces of the flange of the outer panel, wherein, after the production of the folded connection, the adhesive composition on the first surface, with the adhesive composition on the second surface of the flange of the outer panel, at an edge of the flange, forms a continuous layer covering the edge of the flange of the outer panel, and further wherein, wherein, in (A), a layer of the adhesive composition is applied to the first surface and a further layer of the adhesive composition is applied to the second surface of the flange, and, during production of the folded connection in (B) or by activation of the adhesive composition in (C), the two layers are joined into a continuous layer.

12. A method for producing a folded connection, sealed by means of an adhesion composition, between an outer panel, that comes to lie externally in a fold, and an inner panel, that comes to lie internally in the fold, wherein a flange of the outer panel is taken back over a flange of the inner panel, and the flange of the outer panel has a first surface and a second surface, the method comprising:
  (A) applying at least one layer of an adhesive composition to the flange of the outer panel; and
  (B) bending the flange of the outer panel around the flange of the inner panel,
  wherein the adhesive composition is applied to both the first and second surfaces of the flange of the outer panel, wherein, after the production of the folded connection, the adhesive composition on the first surface, with the adhesive composition on the second surface of the flange of the outer panel, at an edge of the flange, forms a continuous layer covering the edge of the flange of the outer panel, wherein the adhesive composition is applied as an adhesive tape that is provided at least partially with a carrier material, and further wherein the carrier material has a softening temperature that lies below the activation temperature of the adhesive composition.

* * * * *